United States Patent [19]
Stein

[11] Patent Number: 5,453,781
[45] Date of Patent: Sep. 26, 1995

[54] APPARATUS AND METHOD FOR MINIMIZING VELOCITY-MISMATCH MTF DEGRADATION IN TDI SYSTEMS

[75] Inventor: John T. Stein, Danbury, Conn.

[73] Assignee: Hughes Aircraft Company, Los Angeles, Calif.

[21] Appl. No.: 110,148

[22] Filed: Aug. 20, 1993

[51] Int. Cl.[6] ................................................ H04N 3/14
[52] U.S. Cl. ..................... 348/169; 348/295; 250/203.1
[58] Field of Search ............................. 348/295, 297, 348/298, 248, 249, 169; 250/332, 370.08, 370.09, 203.1, 203.6, 203.7; H04N 3/14, 5/335

[56] References Cited

U.S. PATENT DOCUMENTS

| | | | |
|---|---|---|---|
| 3,833,762 | 9/1974 | Gudmundsen | 348/208 |
| 4,382,267 | 5/1983 | Angle | 348/298 |
| 4,740,681 | 4/1988 | Tsuno | 348/295 |
| 4,922,337 | 5/1990 | Hunt et al. | 348/88 |
| 4,950,881 | 8/1990 | Kaltschmidt | 250/203.6 |
| 4,952,809 | 8/1990 | McEwen | 250/203.1 |
| 5,196,688 | 3/1993 | Hesse et al. | 250/203.6 |

*Primary Examiner*—James J. Groody
*Assistant Examiner*—Chris Grant
*Attorney, Agent, or Firm*—W. C. Schubert; W. K. Denson-Low; M. W. Sales

[57] ABSTRACT

Disclosed are methods and apparatus that minimize the degradation of the Modulation Transfer Function (MTF) which results from a mismatch between the velocity of an optical image ($V_{TDI}$) and that of a corresponding charge image ($V_{OPTICAL}$) formed in a TDI radiation detector array (14). In accordance with one aspect of this invention, there is developed a figure-of-merit (FOM) that is indicative of a match between the velocities of the optical image and the charge image. The velocity match metric is developed directly from recovered video information, and serves as an input to a closed-loop controller (22, 24, 26, 23, 26') which "servos" the velocity of the charge image in order to maximize the velocity match metric. In that the error signal is indicative of the true optical image velocity, MTF degradation due to velocity mismatch is minimized without requiring apriori knowledge of image velocity.

15 Claims, 7 Drawing Sheets

FIG. 4

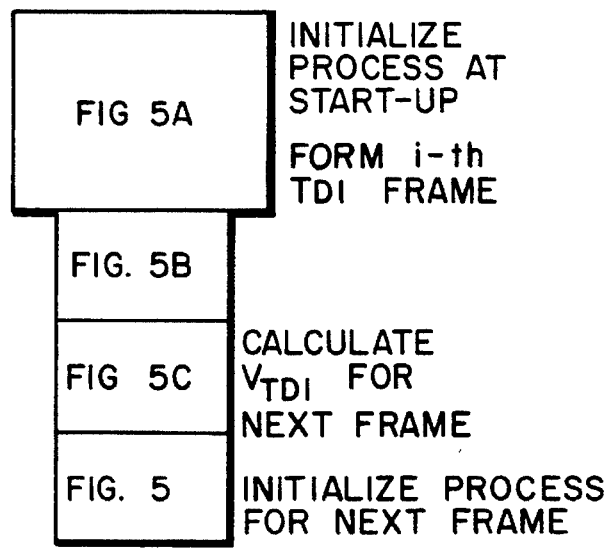

FIG 5A — INITIALIZE PROCESS AT START-UP / FORM i-th TDI FRAME

FIG. 5B

FIG 5C — CALCULATE $V_{TDI}$ FOR NEXT FRAME

FIG. 5 — INITIALIZE PROCESS FOR NEXT FRAME

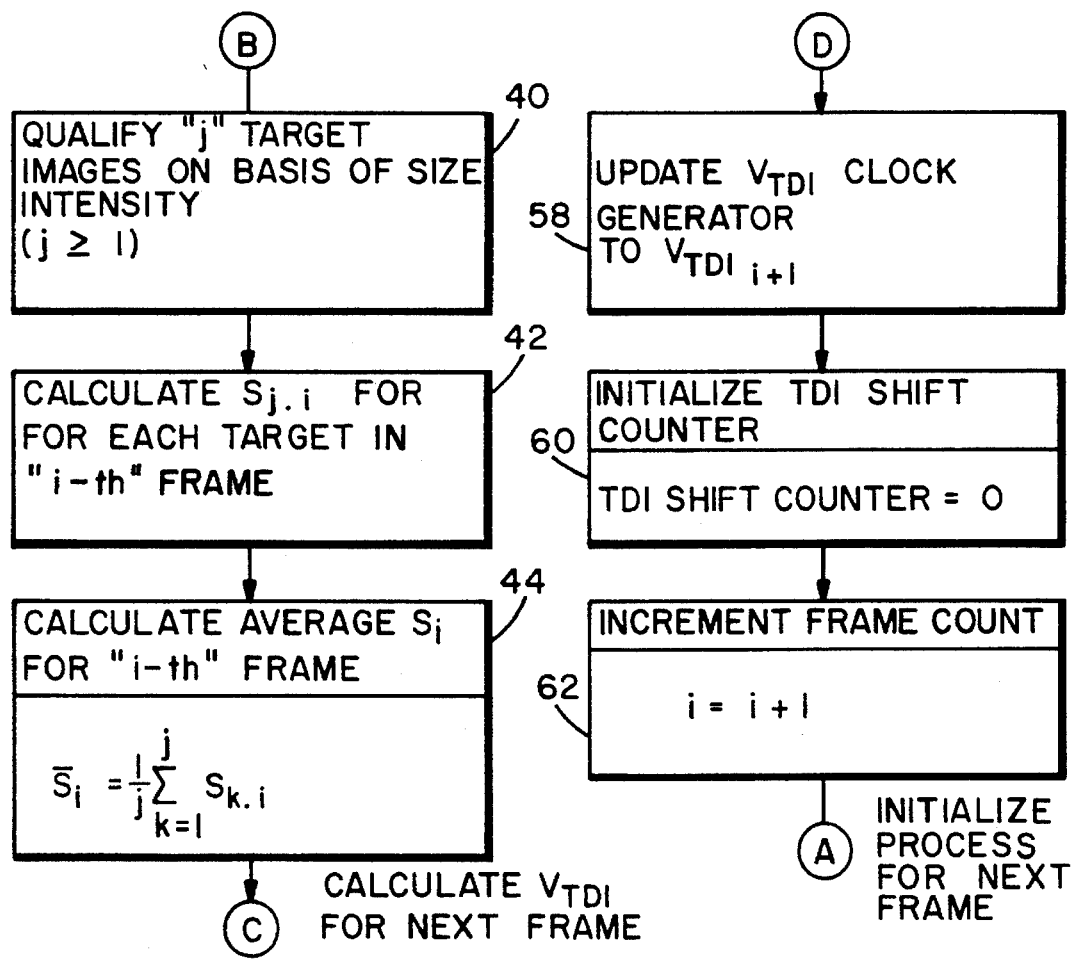

40 — QUALIFY "j" TARGET IMAGES ON BASIS OF SIZE INTENSITY ($j \geq 1$)

42 — CALCULATE $S_{j,i}$ FOR FOR EACH TARGET IN "i-th" FRAME

44 — CALCULATE AVERAGE $\bar{S}_i$ FOR "i-th" FRAME $$\bar{S}_i = \frac{1}{j}\sum_{k=1}^{j} S_{k,i}$$

Ⓒ — CALCULATE $V_{TDI}$ FOR NEXT FRAME

58 — UPDATE $V_{TDI}$ CLOCK GENERATOR TO $V_{TDI\ i+1}$

60 — INITIALIZE TDI SHIFT COUNTER / TDI SHIFT COUNTER = 0

62 — INCREMENT FRAME COUNT / $i = i + 1$

Ⓐ — INITIALIZE PROCESS FOR NEXT FRAME

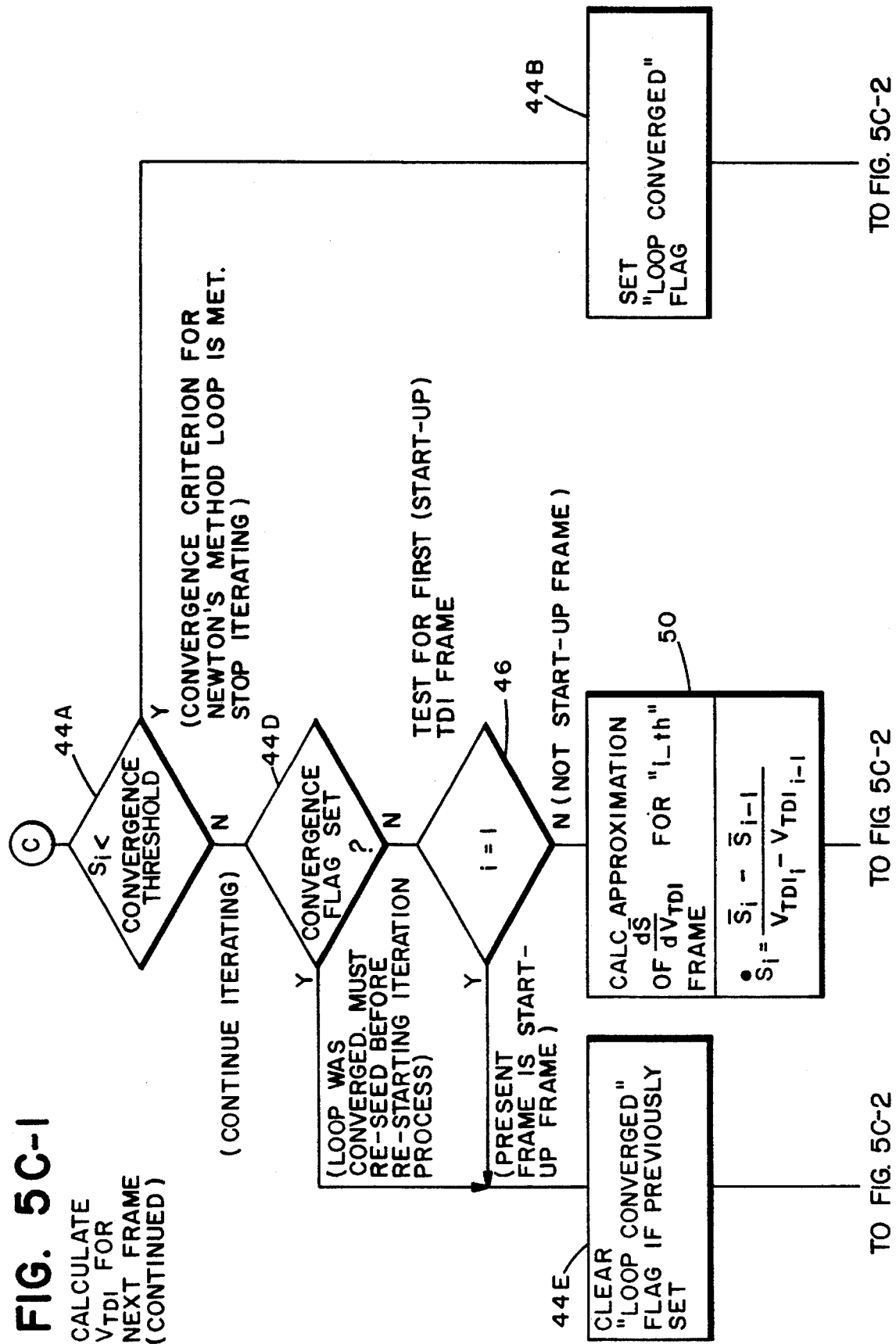

APPARATUS AND METHOD FOR MINIMIZING VELOCITY-MISMATCH MTF DEGRADATION IN TDI SYSTEMS

FIELD OF THE INVENTION

This invention relates generally to optical systems and methods and, in particular, to imaging systems that include a Time Delay and Integrate (TDI) imaging array.

BACKGROUND OF THE INVENTION

A TDI system operates to synchronize the operation of an imaging system with a motion of a feature of interest in a scene viewed by the imaging system in order to increase the integration time and, hence, increase the sensitivity of the imaging system.

It is known that a degradation of a TDI system Modulation Transfer Function (MTF) results from a mismatch between a velocity of an optical image and that of a corresponding charge image formed within a TDI imaging array. This effect is commonly referred to as velocity-mismatch MTF degradation.

In conventional TDI systems, the velocity with which the charge image is moved in the "along-track" direction (the TDI rate) is determined by apriori estimates of the velocity of the optical image, or by indirect measurements of the velocity. This is essentially an open-loop system solution, and any errors that may occur in the estimate of optical image velocity result in the velocity-mismatch MTF degradation referred to above.

As one example, the TDI system may be mounted within a rotating satellite platform and may view a scene through an aperture within a wall of the satellite. An estimate of, and/or a measurement of, the satellite rotational rate is employed to move a desired charge image, such as an image of a star or some other celestial object, across a TDI imaging array. Movement of the charge image is accomplished by clocking the TDI imaging array so as to cause the charge image to move from row to row in the TDI "along-track" direction. However, if the estimate and/or measurement of the satellite rotational rate is in error, then the movement of the charge image of the star does not accurately follow the movement of the actual star image that results from satellite rotation. This difference between the TDI velocity and the actual velocity of image motion results in the degradation of the MTF of the TDI imaging system.

It is thus one object of this invention to provide a TDI imaging system with an improved MTF by substantially eliminating velocity-mismatch MTF degradation.

It is another object of this invention to provide a closed-loop TDI imaging system wherein the velocity of the charge image (TDI velocity) is adaptively controlled in order to maximize a velocity match metric, and wherein the system requires no apriori knowledge of the velocity of the TDI image.

SUMMARY OF THE INVENTION

The foregoing and other problems are overcome and the objects of the invention are realized by methods and apparatus that minimize the degradation of the Modulation Transfer Function (MTF) which results from a mismatch between the velocity of an optical image and that of a corresponding charge image formed in a TDI array. That is, this invention provides both a method and apparatus to minimize velocity-mismatch MTF degradation in a TDI imaging system.

In accordance with one aspect of this invention, there is developed a figure-of-merit (FOM) that is indicative of a match between the velocities of the optical image and the charge image. The velocity match metric is developed directly from recovered video information, and serves as an input to a closed-loop controller which "servos" the velocity of the charge image (TDI velocity) in order to maximize the velocity match metric. That is, the TDI rate is controlled by an error signal that is developed directly from the video information output from the TDI imaging array. As the error signal is indicative of the true optical image velocity, MTF degradation due to velocity mismatch is minimized without requiring apriori knowledge of image velocity.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 illustrates the relative placement of FIGS. 5A through 5D; and

FIGS. 5A–5D are each a portion of a flow chart that illustrates the operation of the $V_{TDI}$ Control Law block of FIG. 2.

DETAILED DESCRIPTION OF THE INVENTION

Figure 1:
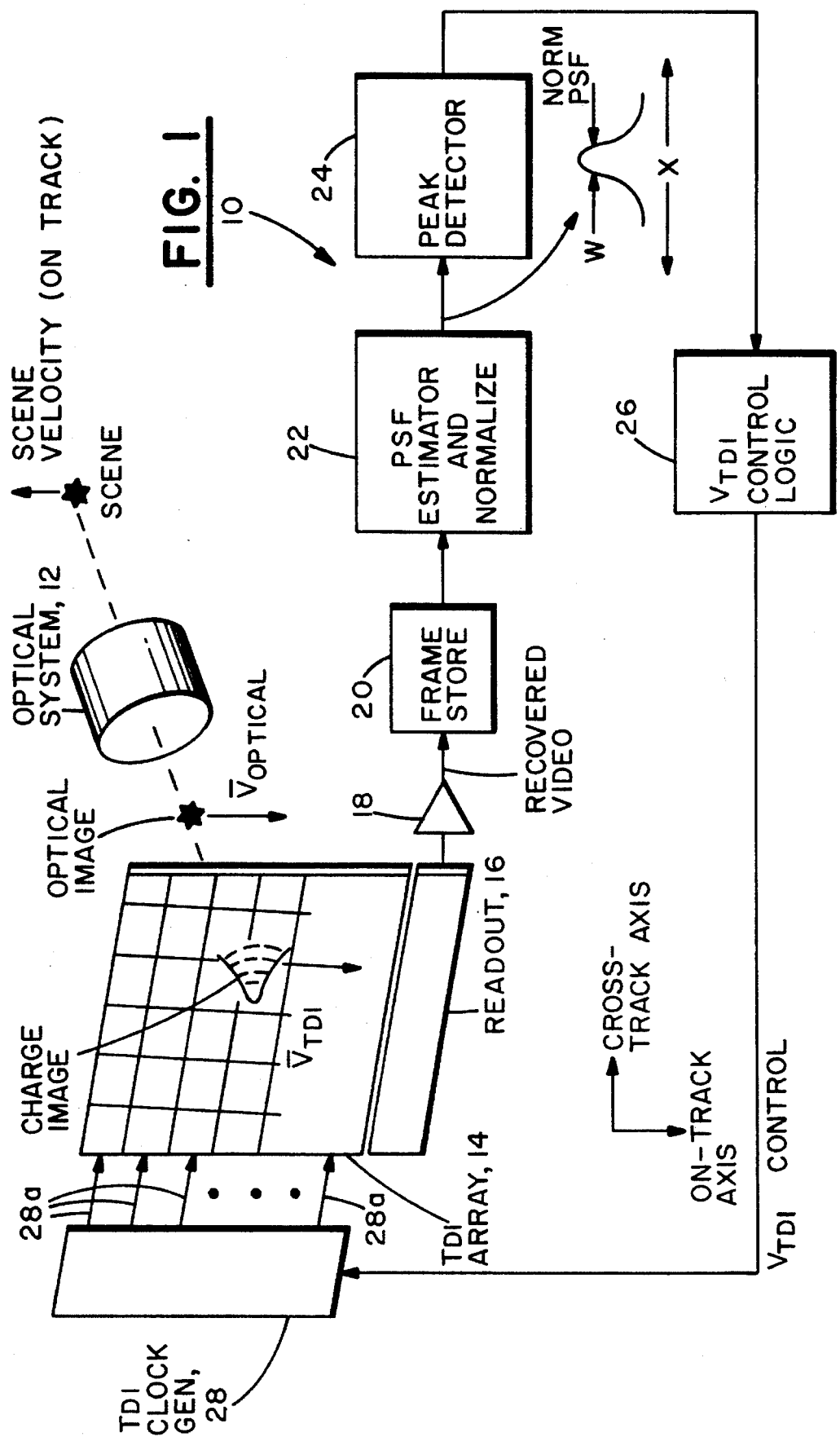
FIG. 1 is block diagram of an embodiment of a system that is constructed and operated in accordance with a first embodiment of the invention.

FIG. 1 is a block diagram of a TDI imaging system 10 that is constructed and operated in accordance with an embodiment of the invention. A scene is viewed by an optical system 12, such as a telescope, which forms an optical image upon a radiation sensitive surface of a two-dimensional TDI array 14. The array is organized as "I" rows and "J" columns of radiation detector elements. The TDI array 14 may be constructed with charge coupled device (CCD) technology, although the teaching of this invention is not limited for use only with CCD imaging arrays. The optical irradiance function incident on the CCD produces a corresponding charge image within the potential wells of the CCD. That is, reception of the optical image results in the generation of a charge packet or charge image within the potential wells of the CCD TDI array 14. Due to motion of the system 10 such as a satellite or tracking system, the scene has an associated along-track velocity component. As a result, the optical image has a corresponding and opposite velocity referred to herein as $V_{OPTICAL}$. A TDI array readout 16 provides, on a row-by-row basis, an output to a buffer amplifier 18. The output of buffer amplifier 18 is recovered TDI video information. The recovered TDI video information is stored in a frame buffer or store 20 until a complete frame of scene video information is accumulated, at which time the frame is processed in accordance with the teaching of this invention.

In accordance with an aspect of the invention, block 22 implements a point spread function (PSF) estimator and normalizer. Block 22 operates to estimate, and also normalize, the point spread function for the charge image within a frame stored within the frame store 20. An output of the block 22 is a normalized PSF which is provided to a peak detector block 24. Peak detector block 24 operates to locate the peak of the PSF in accordance with a predetermined threshold and to provide an output to a TDI velocity ($V_{TDI}$) control logic block 26. The output of control logic 26 is a $V_{TDI}$ control signal which provides feedback control to a TDI clock generator 28. TDI clock generator 28 generates clocks 28a which are used to move the charge image along the along-track axis of the TDI array 14.

By manipulating the potential distribution within the CCD array, the TDI clock generator 28 imparts a similar "along-track" velocity ($V_{TDI}$) to the charge image formed in the CCD potential wells. When $V_{TDI}$ is made equal to $V_{OPTICAL}$, degradation of system MTF due to velocity-mismatch is eliminated.

The teaching of the invention automatically adjusts $V_{TDI}$ in a manner which minimizes the breadth (width) of the PSF in the "along-track" direction of the recovered video signal. In that the MTF is known to be the magnitude of a Fourier transform of the PSF, minimizing the breadth of the PSF corresponds to maximizing the MTF.

Development of the required estimate of PSF is relatively uncomplicated in applications where the power spectrum of the imagery peaks at high spatial frequencies; e.g. star trackers. In such cases the recovered imagery is essentially a direct measure of the PSF. Applications characterized by less-peaked scene spectra, such as images, may require high-pass filtering or "edge-detecting" algorithms in the "along-track" direction as part of the PSF estimator.

Normalizing the PSF estimate to its total energy content yields a function whose peak value varies inversely with PSF breadth. The TDI rate $V_{TDI}$ is then adjusted to maximize the peak PSF. This condition corresponds to minimum PSF breadth and maximum MTF.

The overall effect is to provide a closed loop system wherein a Figure of Merit and an error signal are derived from the recovered video, the error signal indicating a difference between $V_{OPTICAL}$ and $V_{TDI}$. The error signal is then employed to generate a control signal $V_{TDI}$ control) so as to minimize the difference between $V_{OPTICAL}$ and $V_{TDI}$. This maximizes the MTF of the TDI imaging system 10.

Figure 2:
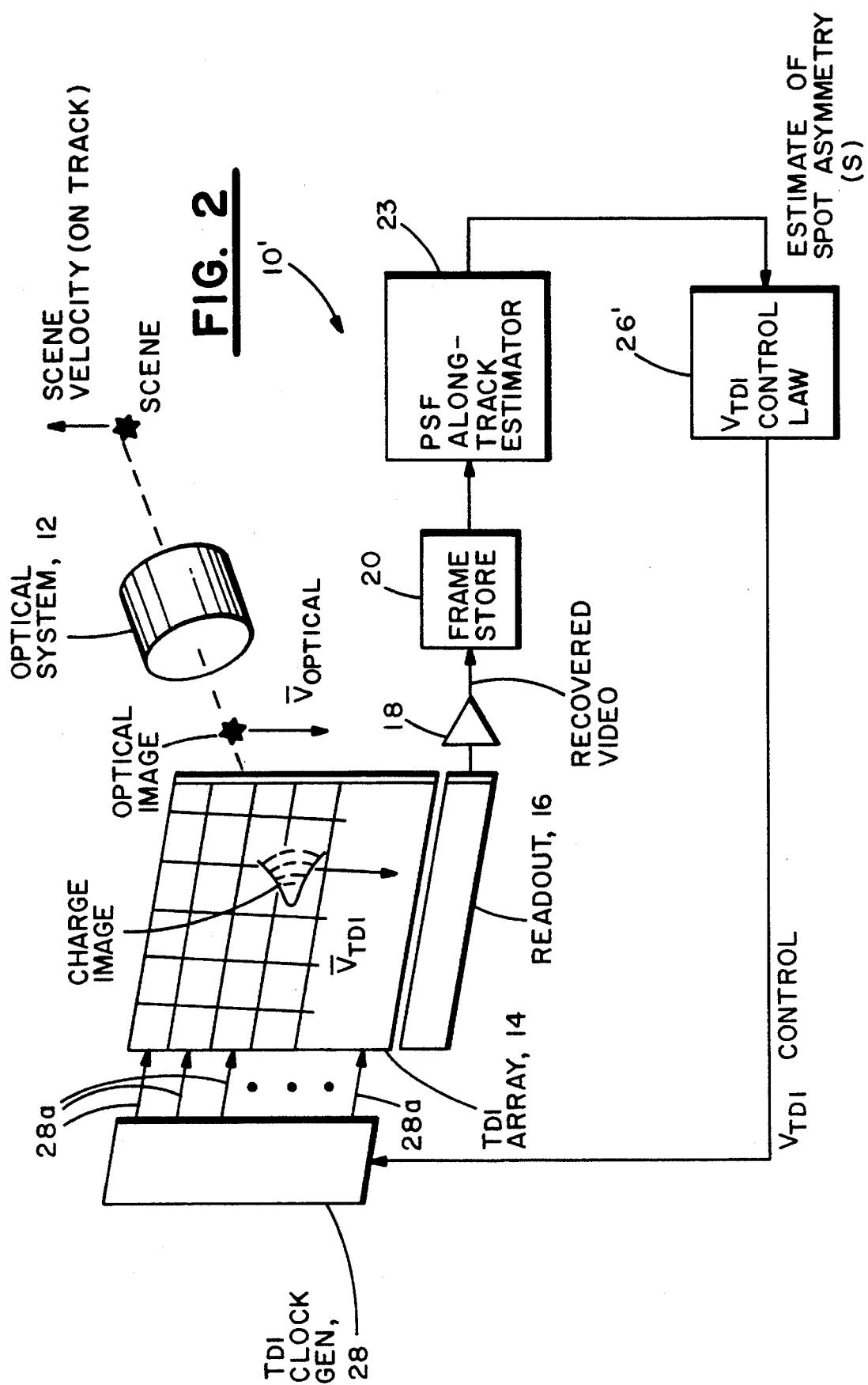
FIG. 2 is block diagram of an embodiment of a system that is constructed and operated in accordance with a second embodiment of the invention.

FIG. 2 is a block diagram of a second, presently preferred embodiment of a TDI imaging system 10'. Components that function as in FIG. 1 are referred to and numbered identically. Significant differences between the system 10 of FIG. 1 and the system 10' of FIG. 2 are as follows. In FIG. 2 the PSF estimator and normalizer 22 is modified to function as a PSF along-track estimator 23. That is, normalization is not accomplished. Furthermore, the peak detector 24 is eliminated, and the $V_{TDI}$ control logic block 26 is referred to as a $V_{TDI}$ control law block 26' which operates upon an estimate of charge image spot asymmetry (S) that is output from the PSF along-track estimator 23. As in FIG. 1, the system 10' of FIG. 2 is a closed loop system that operates to maximize the MTF of the TDI imaging system.

Figure 3:
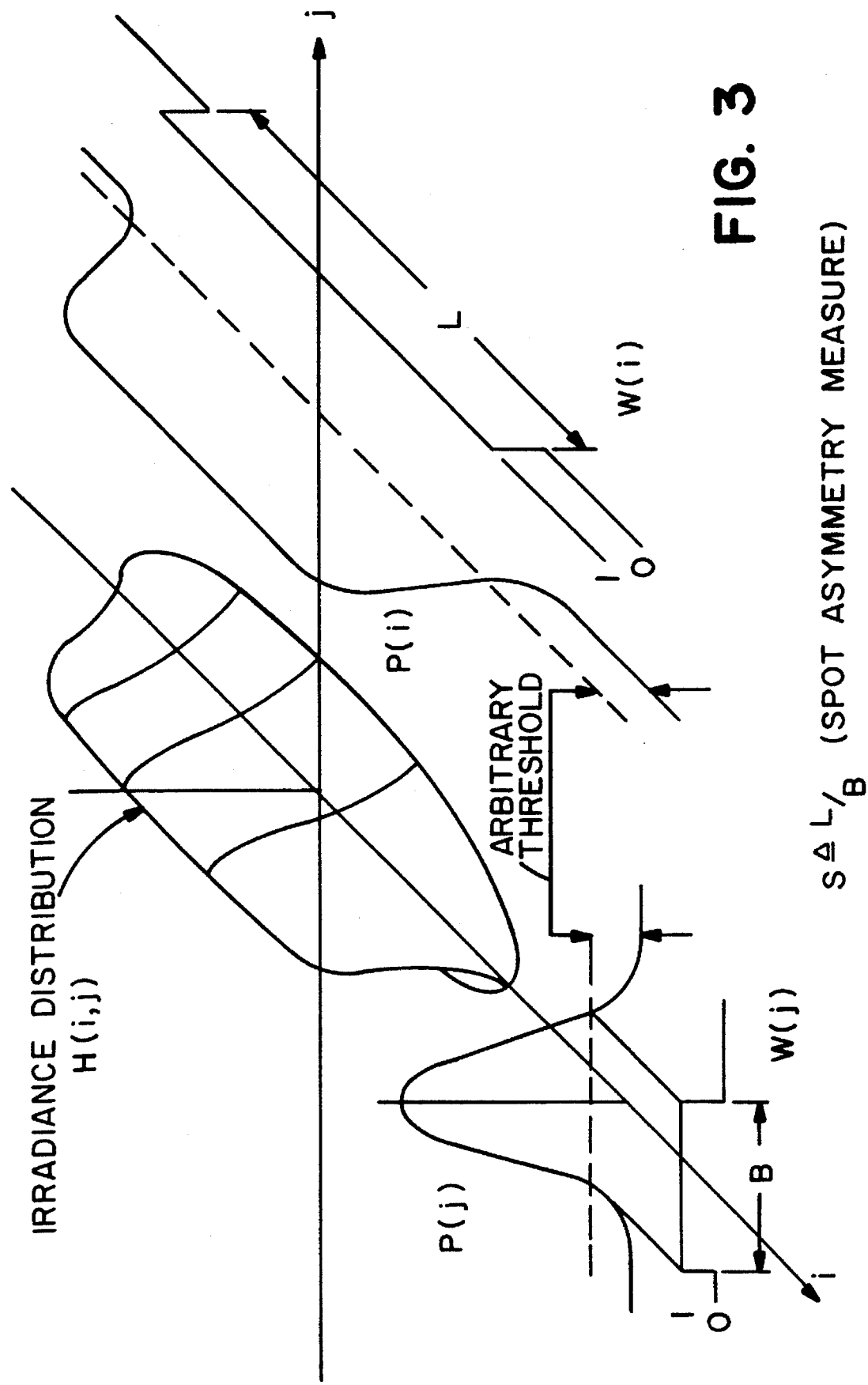
FIG. 3 is a graph that illustrates the operation of the PSF estimator of FIG. 2.

FIG. 3 illustrates the operation of the PSF estimator 23 of FIG. 2. The contents of the frame store 20 are illustrated for the case where the TDI velocity ($V_{TDI}$) is poorly matched to the optical velocity ($V_{OPTICAL}$) and significant velocity-mismatch MTF degradation is present. The mismatch between $V_{TDI}$ and $V_{OPTICAL}$ manifests itself as a "smearing" of the spot energy in the "along-track" direction (the i-axis). The j-axis is taken to be the "cross-track" axis. In general, the velocity of the system 10' is assumed to be parallel to the i-axis. Only a negligible velocity component is assumed to exist along the j-axis.

The PSF estimator 23 operates by developing two, one-dimensional profiles of a two-dimensional irradiance distribution H(i,j). One profile, P(i), is taken in the "along-track" direction. Each of these two profiles represents the summation along the orthogonal axis of the two-dimensional irradiance function H(i,j). It should be noted that while P(i) is broadened as a result of the velocity mismatch, no relative motion exists in the "cross-track" direction, and the unbroadened profile P(j) describes the limiting case whose MTF is that of the optical system alone.

Both profiles (along-track and cross-track) are compared to an arbitrary threshold level, and the spatial extent over which each profile exceeds the threshold level is determined. This is shown in FIG. 3 as the quantity "B" in the "cross-track" direction, and the quantity "L" in the "along-track" direction. A metric describing the asymmetry of H(i,j) is given by the quantity "S", where $S \triangleq L/B$. Taking this quotient normalizes the "along-track" length L to the "cross-track" breadth B, thus rendering the process insensitive to variations in total image energy which affect both L and B equally. For the case where $V_{TDI}$ precisely matches $V_{OPTICAL}$ the spot image is symmetrical, L is identical to B, and S=1. The $V_{TDI}$ control law block 26' adjusts the clock rate of the TDI clock generator 28 in a manner which drives S toward unity.

That is, in accordance with the teaching of this invention there is provided a closed-loop TDI system wherein at least one electrical signal, such as the clocks 28a, are varied in accordance with a characteristic of a video image that represents a feature of interest. By example, the characteristic may be spot asymmetry or PSF. The at least one electrical signal is varied so as to cause the charge packet to move through the imaging array with a velocity $V_{TDI}$, wherein $V_{TDI}$ is made approximately equal to $V_{OPTICAL}$ for maximizing a Modulation Transfer Function of the imaging system.

In summary, the following relationships are expressed in the diagram of FIG. 3:
(a) the irradiance distribution in the focal plane, where i=the in-track (TDI) direction and j=the cross-track direction, H(i,j);
(b) the in-track irradiance profile, $$P(i) \triangleq \sum_{j=0}^{J} H(i,j)$$

(c) the cross-track irradiance profile, $$P(j) \triangleq \sum_{i=0}^{I} H(i,j)$$

(d) the thresholded, in-track irradiance profile, $$\omega(i) \triangleq \begin{cases} 0 \text{ if } P(i) < \text{THRESHOLD} \\ 1 \text{ if } P(i) \geq \text{THRESHOLD} \end{cases}$$

(e) the thresholded, cross-track irradiance profile, $$\omega(j) \triangleq \begin{cases} 0 \text{ if } P(j) < \text{THRESHOLD} \\ 1 \text{ if } P(j) \geq \text{THRESHOLD} \end{cases}$$

(f) the in-track length L of H(i,j), $$L \triangleq \sum_{i=0}^{I} \omega(i)$$

(g) the cross-track breadth B of H(i,j), $$B \triangleq \sum_{j=0}^{J} \omega(j)$$

and, (h) the shape factor S $$S \triangleq \frac{L}{B}.$$

FIGS. 5A–5D are each a portion of a flow chart that illustrates the operation of the $V_{TDI}$ control law block 26' of FIG. 2, with FIGS. 5A–5D being organized as indicated in FIG. 4. It should thus be realized that the control law block 26' may be implemented with a suitable data processor that is programmed in accordance with the flow chart of FIGS. 5A–5D, or may be implemented with discrete circuit blocks that function in accordance with the various blocks of the flow chart. Various combinations of these two approaches may also be implemented.

Figure 5A:
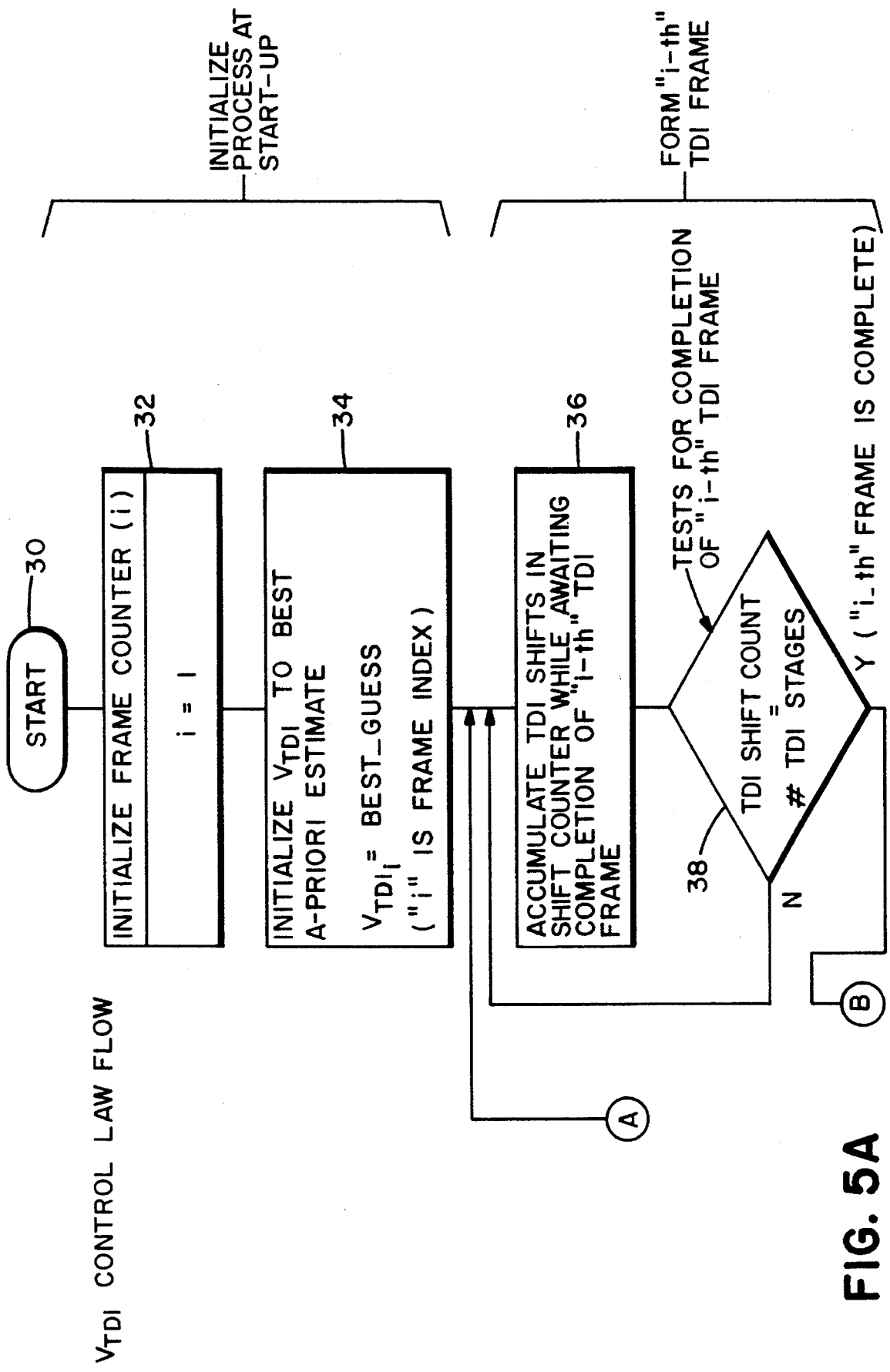

The $V_{TDI}$ control law block 26' operates in accordance with four general operations: (a) Initialize Process at Start-up (FIG. 5A); (b) Form i-th TDI Frame (FIG. 5A); (c) Calculate $V_{TDI}$ for Next Frame (FIGS. 5B and 5C); and (d) Initialize Process for Next Frame (FIG. 5D).

Blocks 30, 32 and 34 of FIG. 5A implement the Initialize Process at Start-up procedure. At Block 32 a TDI frame counter is initialized, and at Block 34 $V_{TDI}$ is initialized to some apriori estimate. The estimate need not be accurate, in that the subsequent steps of the method will eventually cause $V_{TDI}$ to converge to an optimum value.

Blocks 36 and 38 of FIG. 5A implement the Form i-th TDI Frame procedure. These Blocks essentially execute a loop which counts a number of recovered video readouts that are obtained from the readout circuit 16 of FIG. 2. When a full frame is accumulated, control passes, via connector B, to Block 40 of FIG. 5B.

Figures 2, 5C:
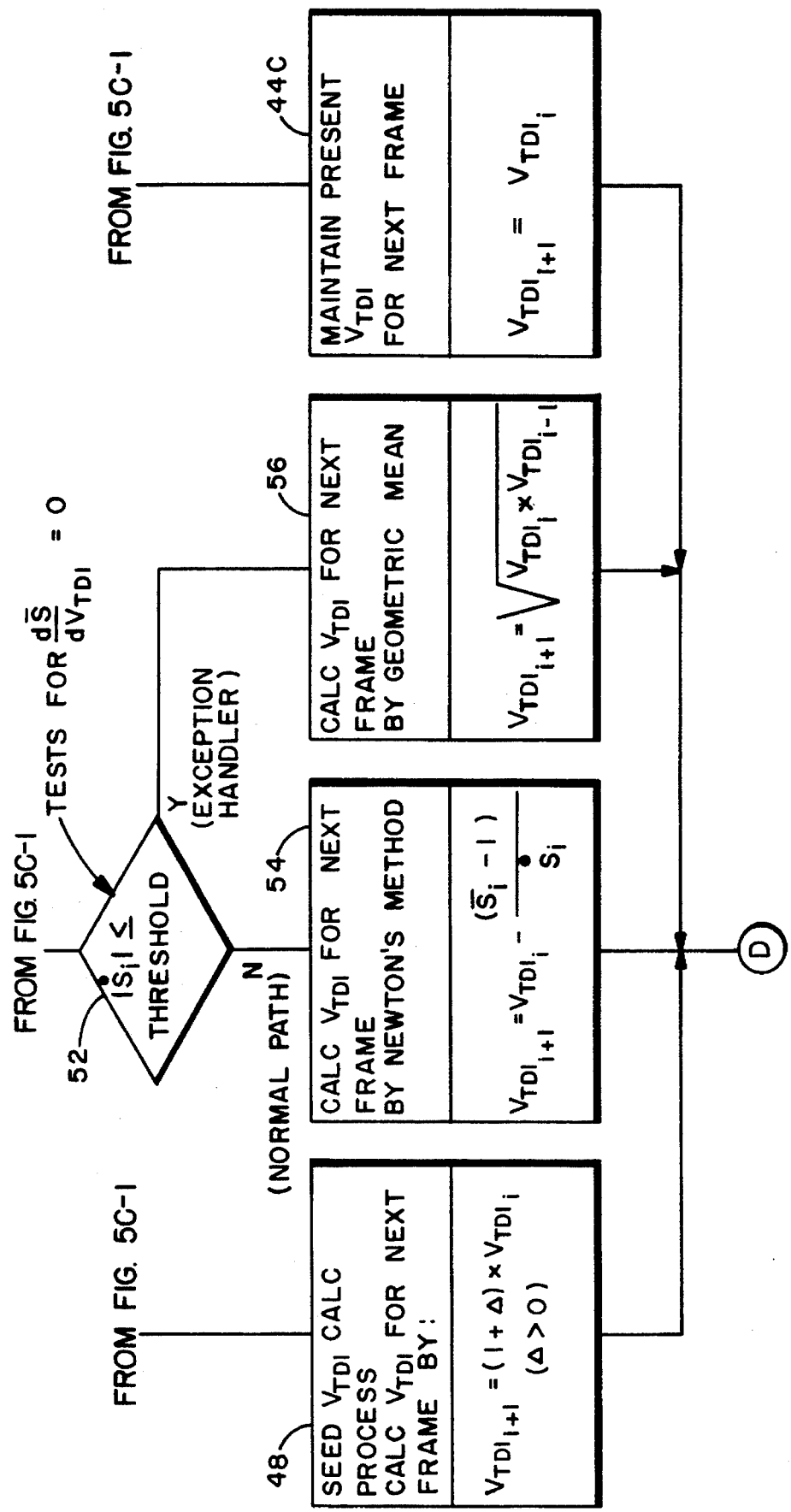

Blocks 40–56 of FIGS. 5B and 5C implement the Calculate $V_{TDI}$ for Next Frame Procedure. At Block 40 the method examines the frame of recovered video and identifies or qualifies j (j≧21) target images on the basis of image size and intensity. At Block 42, $S_{j,i}$ is determined for each of the j targets of the i-th frame. At Block 44, an average $S_i$ is determined for the entire i-th frame in accordance with:

$$\overline{S}_i = \frac{1}{j} \sum_{k=1}^{j} S_{k,i}.$$

Referring to FIG. 5C-1 at Block 44A $S_i$ is compared to a convergence threshold. If Yes, indicating that the convergence criterion for Newton's Method is met, a loop converged flag is set at Block 44B, and the present $V_{TDI}$ is maintained for the next frame. Control then passes, via connector D, to FIG. 5D. If No at Block 44A, indicating that a further iteration is required, a determination is made at Block 44D if the convergence flag was previously set. If Yes, indicating that the loop was converged and must be re-seeded before starting a next iteration, control passes through Block 44E, where the loop converged flag is reset, and then to Block 48. Block 48 is also entered from Block 46, via Block 44E, if the determination at Block 44D indicates No.

The operation at Blocks 44A–44C indicates that the asymmetry factor S has fallen below the threshold criterion, and loop iteration may be stopped. The loop is subsequently re-seeded (Block 48), and the iteration of $V_{TDI}$ will resume if at some time the value of S rises above the convergence threshold. Such a change can occur due to, for example, a change in velocity of the platform to which the TDI system is attached, or due to a change in velocity of the target being tracked by the TDI system. As such, the value of the convergence threshold is application specific, and is a function of the required tracking performance.

Block 46 is a decision block where a determination is made if the current frame is an initial, start-up frame. If Yes, control passes to Block 48 where a value for $V_{TDI}$, for a next (i+1) frame, is determined in accordance with:

$$V_{TDI_{i+1}} = (1+\Delta) \times V_{TDI_i}, \text{ where } (\Delta > 0).$$

If No at Block 46, control passes to Block 50 where an approximation of $d\overline{S}/dV_{TDI}$ for the i-th frame is determined in accordance with:

$$\dot{\overline{S}}_i = \frac{\overline{S}_i - \overline{S}_{i-1}}{V_{TDI_i} - V_{TDI_{i-1}}}.$$

At Block 52 the result of Block 50 is tested to determine if the result less than or equal to a threshold value. If No (normal path), then $V_{TDI}$ for the next frame is determined by Newton's Method in accordance with:

$$V_{TDI_{i+1}} = V_{TDI_i} - \frac{\overline{S}_i}{\dot{\overline{S}}_i}.$$

Else, if the result of the comparison at Block 52 indicates Yes, the $V_{TDI}$ for the next frame is determined at Block 56 by a geometric mean in accordance with:

$$V_{TDI_{i+1}} = \sqrt{V_{TDI_i} \times V_{TDI_{i-1}}}.$$

After the execution of Blocks 44C, 48, 54 or 56, control passes, via connector D, to Block 58 of FIG. 5D. Blocks 58, 60 and 62 implement the Initialize Process for Next Frame routine. At Block 58, the TDI clock generator 28 is updated with the determined value of $V_{TDI}$ for the next frame. At Blocks 60 and 62 the TDI shift counter and frame counter are initialized for the next frame, and control then passes, via connector A, to Block 36 of FIG. 5A.

While the invention has been particularly shown and described with respect to two embodiments thereof, it will be understood by those skilled in the art that changes in form and details may be made therein without departing from the scope and spirit of the invention.

What is claimed is:

1. A method for operating an imaging system, comprising the steps of:

viewing a scene and forming an image of at least one feature of interest within the scene, the feature of interest having a velocity $V_{optical}$;

converting the image to a charge packet within an imaging means having a two-dimensional array of radiation detectors;

reading out the imaging means to form a frame of recovered video information, the frame including a video image corresponding to the charge packet; and using a characteristic of said video image to vary at least one electrical signal to cause the charge packet to move through the imaging means with a velocity $V_{TDI}$, wherein $V_{TDI}$ is made approximately equal to $V_{OPTICAL}$.

2. A method as set forth in claim 1 wherein the step of using includes a step of minimizing a point Spread Function associated with the video image.

3. A method as set forth in claim 1 wherein the step of using includes a step of minimizing a spatial extent of a spot image associated with the video image.

4. A method as set forth in claim 1 wherein $V_{TDI}$ is primarily along an along-track axis of the imaging means, wherein a cross-track axis of the imaging means is orthogonally disposed to the along-track axis, and wherein the step of using includes the repetitively iterated steps of:

developing, along each of the along-track and the cross-track axes, a one-dimensional profile of a two-dimensional irradiance distribution;

comparing the along-track one-dimensional profile to a threshold L and the cross-track one dimensional profile to a threshold B;

developing a metric S that is a function of L divided by B; and varying the at least one electrical signal so as to reduce, for a next frame, the magnitude of the metric S.

5. A closed loop Time Delay and Integrate imaging system, comprising:

means for viewing a scene and for forming an image of at least one feature of interest within the scene, the feature of interest having a velocity $V_{OPTICAL}$;

imaging means for converting the image to a charge packet, said imaging means including a two-dimensional array of radiation detectors;

means for reading out the imaging means to form a frame of recovered video information, the frame including a video image corresponding to the charge packet; and means for using a characteristic of the video image to vary at least one electrical signal to cause the charge packet to move through the imaging means with a velocity $V_{TDI}$, wherein $V_{TDI}$ is made approximately equal to $V_{OPTICAL}$.

6. An imaging system as set forth in claim 5 wherein said using means includes means for minimizing a Point Spread Function associated with the video image.

7. An imaging system as set forth in claim 5 wherein said using means includes means for minimizing a spatial extent of a spot image associated with the video image.

8. An imaging system as set forth in claim 5 wherein $V_{TDI}$ is primarily along an along-track axis of said imaging means, wherein a cross-track axis of said imaging means is orthogonally disposed to the along-track axis, and wherein said using means includes:

means for developing, along each of the along-track and the cross-track axes, a one-dimensional profile of a two-dimensional irradiance distribution;

means for comparing the along-track one-dimensional profile to a threshold L and the cross-track one dimensional profile to a threshold B;

means for developing a metric S that is a function of L divided by B; and means for varying the at least one electrical signal so as to reduce, for a next frame, the magnitude of the metric S.

9. An imaging system as set forth in claim 5 wherein said imaging means is comprised of a two-dimensional array of CCD radiation detectors organized by rows and columns of radiation detectors, and wherein said varying means applies electrical signals to said two-dimensional array so as to move the charge packet along rows or columns of said two-dimensional array.

10. The invention of claim 1 wherein the step of using includes maximizing a Modulation Transfer Function associated with the video image.

11. The invention of claim 5 wherein the means for using includes maximizing a Modulation Transfer Function associated with the video image.

12. A method for operating a satellite or tracking system which moves relative to a scene comprising the steps of:

viewing the scene and forming an image of at least one feature of interest in the scene, the feature having a velocity $V_{OPTICAL}$;

converting the image to a charge packet within an imaging means;

reading out the imaging means to provide video information corresponding to the charge packet; and using a characteristic of the video information to vary the velocity $V_{TDI}$ at which the charge packet moves through the imaging such that $V_{TDI}$ is made approximately equal to $V_{OPTICAL}$.

13. A satellite or tracking system which moves relative to a scene comprising:

means for viewing the scene and forming an image of at least one feature of interest in the scene, the feature having a velocity $V_{OPTICAL}$;

imaging means for converting the image to a charge packet;

means to provide video information corresponding to the charge packet;

means for using a characteristic of the video information to vary the velocity at which charge packet moves through the imaging means, $V_{TDI}$, such that $V_{TDI}$ is approximately equal to $V_{OPTICAL}$.

14. The method of claim 12 wherein the step of using video information includes a step of minimizing a point spread function associated with a video image.

15. The satellite or tracking system of claim 13 wherein the means for using video information includes means for minimizing a point spread function associated with a video image.

* * * * *